US010808680B2

(12) United States Patent
Concha et al.

(10) Patent No.: US 10,808,680 B2
(45) Date of Patent: Oct. 20, 2020

(54) SYSTEM AND METHOD FOR REDUCING LOADS OF A WIND TURBINE WHEN A ROTOR BLADE BECOMES STUCK

(71) Applicant: General Electric Company, Schenectady, NY (US)

(72) Inventors: Carlos Alberto Concha, Queretaro (MX); Samuel David Draper, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 168 days.

(21) Appl. No.: 16/037,529

(22) Filed: Jul. 17, 2018

(65) Prior Publication Data

US 2020/0025172 A1 Jan. 23, 2020

(51) Int. Cl.
*F03D 17/00* (2016.01)
*F03D 7/02* (2006.01)

(52) U.S. Cl.
CPC ......... *F03D 7/0212* (2013.01); *F03D 7/0264* (2013.01); *F03D 17/00* (2016.05); *F05B 2270/331* (2013.01)

(58) Field of Classification Search
CPC ...... F03D 7/0212; F03D 17/00; F03D 7/0264; F05B 2270/331
See application file for complete search history.

(56) References Cited

U.S. PATENT DOCUMENTS

| | | | |
|---|---|---|---|
| 7,445,420 B2 | 11/2008 | Yoshida | |
| 7,728,452 B2 | 6/2010 | Arinaga et al. | |
| 8,026,623 B2 * | 9/2011 | Wakasa | F03D 7/043 290/44 |
| 8,100,628 B2 | 1/2012 | Frese et al. | |
| 8,217,524 B2 * | 7/2012 | Nakashima | F03D 7/0224 290/44 |
| 8,680,700 B2 | 3/2014 | Gomez De Las Heras Carbonell et al. | |
| 8,749,084 B2 | 6/2014 | Gjerlov et al. | |
| 9,371,819 B2 | 6/2016 | Grabau | |
| 9,416,771 B2 | 8/2016 | Obrecht et al. | |
| 2006/0273595 A1 * | 12/2006 | Avagliano | F03D 7/028 290/44 |

(Continued)

FOREIGN PATENT DOCUMENTS

| | | | | |
|---|---|---|---|---|
| EP | 2963286 A1 * | 1/2016 | ............. | F03D 7/024 |
| EP | 3409940 A1 | 12/2018 | | |

OTHER PUBLICATIONS

U.S. Appl. No. 15/984,936, filed May 21, 2018.
European Search Report, dated Nov. 27, 2019.

*Primary Examiner* — Aaron R Eastman
*Assistant Examiner* — Theodore C Ribaneneyra
(74) *Attorney, Agent, or Firm* — Dority & Manning, P.A.

(57) ABSTRACT

A method for reducing loads of a wind turbine when a rotor blade of the wind turbine is stuck. The method includes continuously monitoring, via a controller, a loading effect of the stuck rotor blade of the wind turbine. The method also includes providing, via the controller, a predetermined schedule that relates the monitored loading effect of the stuck rotor blade of the wind turbine with a yaw angle for a nacelle of the wind turbine. In addition, the method includes yawing, via the controller, the nacelle of the wind turbine away from an incoming wind direction according to the predetermined schedule.

17 Claims, 7 Drawing Sheets

(56) References Cited

U.S. PATENT DOCUMENTS

| | | | |
|---|---|---|---|
| 2008/0150282 A1* | 6/2008 | Rebsdorf | F03D 7/0284 290/44 |
| 2008/0290664 A1* | 11/2008 | Kruger | F03D 7/0224 290/55 |
| 2009/0066089 A1 | 3/2009 | Arinaga et al. | |
| 2009/0081041 A1 | 3/2009 | Frese et al. | |
| 2012/0139248 A1 | 6/2012 | Bertolotti | |
| 2015/0176570 A1* | 6/2015 | Egedal | F03D 7/044 416/1 |
| 2016/0215759 A1* | 7/2016 | Fleming | F03D 7/046 |
| 2017/0226989 A1* | 8/2017 | Hammerum | F03D 7/0264 |

\* cited by examiner

| LOADING EFFECT | YAW OFFSET |
|---|---|
| 1000kNm | -30° |
| 2000kNm | -30° |
| 3000kNm | -30° |
| 4000kNm | 10° |
| 5000kNm | 10° |
| 6000kNm | 10° |

SYSTEM AND METHOD FOR REDUCING LOADS OF A WIND TURBINE WHEN A ROTOR BLADE BECOMES STUCK

FIELD

The present disclosure relates generally to wind turbines, and more particularly to systems and methods for reducing loads of a wind turbine when a rotor blade becomes stuck during an idling scenario.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor including one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

During operation, the direction of the wind which powers the wind turbine may change. The wind turbine may thus adjust the nacelle through, for example, a yaw adjustment about a longitudinal axis of the tower to maintain alignment with the wind direction. In addition, when the wind turbine is parked or idling, conventional control strategies include actively tracking the wind direction to provide better alignment to the wind direction so as to minimize start-up delays when the wind speed increases or decreases back into the operating range.

However, in a situation where the wind turbine is faulted and one of the rotor blades becomes stuck (unlike the normal idling situation), there are limited benefits to tracking the wind as repair is needed before restarting the wind turbine. In addition, in such situations, the wind turbine can experience increased loads due to the stuck rotor blade, as well as rotor imbalance.

Accordingly, improved systems and methods for systems and methods for reducing loads of a wind turbine when a rotor blade becomes stuck during an idling scenario would be welcomed in the art.

BRIEF DESCRIPTION

Aspects and advantages of the invention will be set forth in part in the following description, or may be obvious from the description, or may be learned through practice of the invention.

In one aspect, the present disclosure is directed to a method for reducing loads of a wind turbine when a rotor blade of the wind turbine is stuck. The method includes continuously monitoring, via a controller, a loading effect of the stuck rotor blade of the wind turbine. The method also includes providing, via the controller, a predetermined schedule that relates the monitored loading effect of the stuck rotor blade of the wind turbine with a yaw angle for a nacelle of the wind turbine. In addition, the method includes yawing, via the controller, the nacelle of the wind turbine away from the incoming wind direction according to the predetermined schedule.

In one embodiment, the predetermined schedule comprises a plurality of loading effects each corresponding to a different yaw angle for the nacelle of the wind turbine. In another embodiment, the step of yawing the nacelle of the wind turbine according to the predetermined schedule may include continuously providing the different yaw angles to one or more yaw drive mechanisms of the rotor blade based on the plurality of loading effects instead of applying a single yaw angle when the rotor blade becomes stuck.

In further embodiments, the method may include monitoring a rotor speed of a rotor of the wind turbine and yawing the nacelle of the wind turbine according to the predetermined schedule only when the rotor speed is below a predetermined speed threshold.

In additional embodiments, the method may include yawing the nacelle of the wind turbine according to the predetermined schedule so as to avoid a paddling or loading effect of the rotor blade. As described herein, the paddling effect of the rotor blade occurs when the rotor approaches a zero-degree position and wind hits the wind turbine while the rotor deaccelerates rapidly, thereby causing high loading in the rotor blade and a tower of the wind turbine.

In several embodiments, the method may further include detecting the paddling effect of the wind turbine in response to yawing the nacelle according to the predetermined schedule and continuously yawing the nacelle of the wind turbine to different yaw angles until the paddling effect is reduced below a predetermined threshold. In further embodiments, the method may include yawing the nacelle of the wind turbine according to the predetermined schedule only when the wind turbine is shutdown or idling.

In another aspect, the present disclosure is directed to a system for reducing loads of a wind turbine when a rotor blade of the wind turbine is stuck. The system includes at least one sensor configured for monitoring a loading effect of the stuck rotor blade of the wind turbine and a controller communicatively coupled to the sensor(s). The controller includes at least one processor configured to perform one or more operations, including but not limited to receiving a predetermined schedule that relates the monitored loading effect of the stuck rotor blade of the wind turbine with a yaw angle for a nacelle of the wind turbine and yawing the nacelle of the wind turbine away from the incoming wind direction according to the predetermined schedule. It should also be understood that the system may further include any of the additional features as described herein.

In yet another aspect, the present disclosure is directed to a method for reducing loads of a wind turbine when a rotor blade of the wind turbine is stuck. The method includes continuously monitoring, via a controller, a loading effect of the stuck rotor blade of the wind turbine. The method also includes yawing, via the controller, a nacelle of the wind turbine away from an incoming wind direction to a first yaw angle based on the loading effect. Further, the method includes detecting, via the controller, a first loading effect of the rotor blade in response to yawing the nacelle to the first yaw angle. Moreover, the method includes yawing, via the controller, the nacelle of the wind turbine to a different, second yaw angle if the first loading effect exceeds a predetermined loading threshold. As such, the controller is configured to continuously monitor the loading effect and continue to yaw the nacelle until the loading effect is below the predetermined loading threshold.

In one embodiment, the method may include detecting a second loading effect in response to yawing the nacelle to the second yaw angle. In another embodiment, the method may include continuously yawing the nacelle of the wind turbine to different yaw angles until the second loading effect is reduced below a predetermined threshold. It should also be understood that the method may further include any of the additional features and/or steps as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
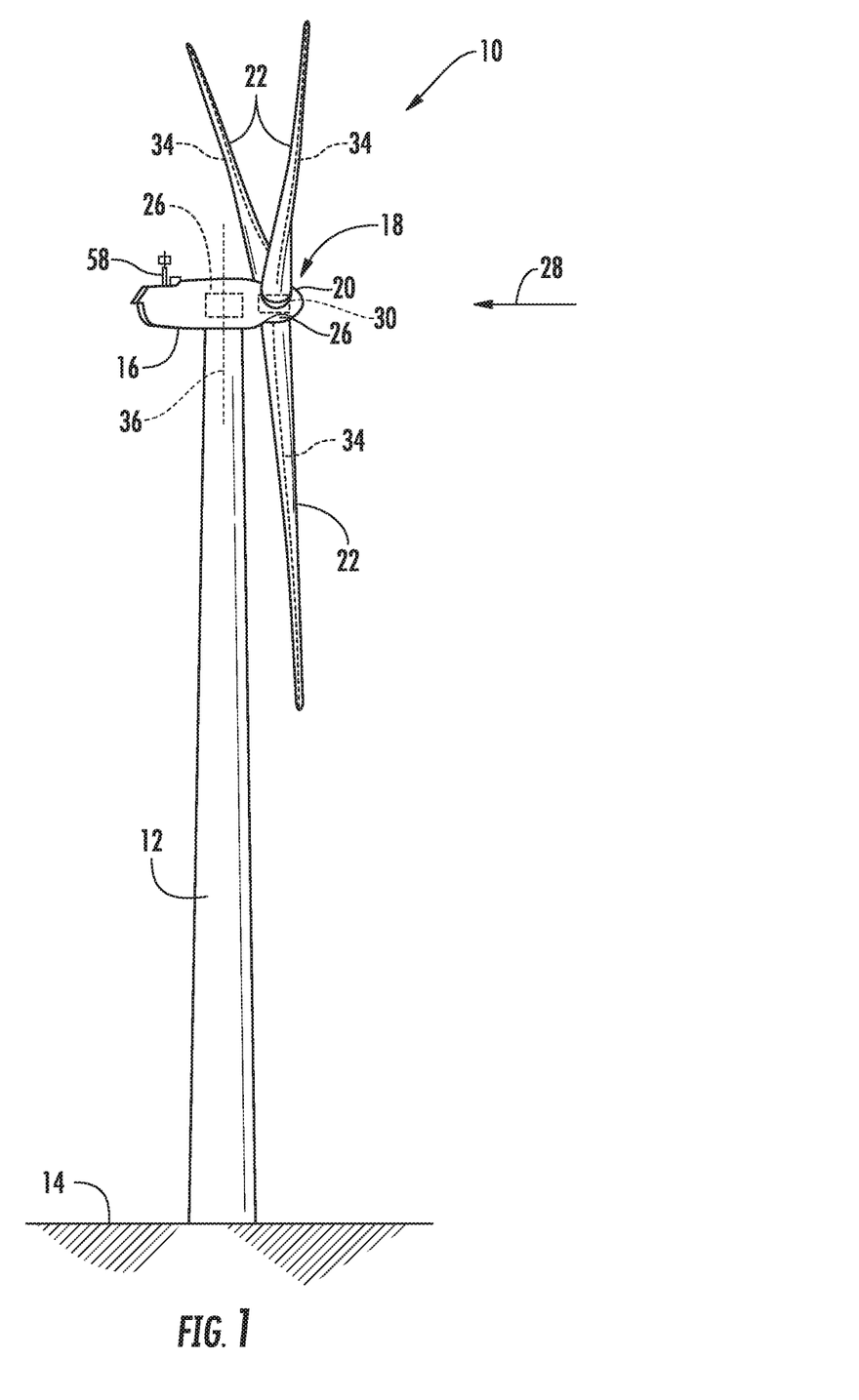
FIG. 1 illustrates a perspective view of a wind turbine according to one embodiment of the present disclosure.

Referring now to the drawings, FIG. 1 illustrates perspective view of one embodiment of a wind turbine 10 according to the present disclosure. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

Figure 2:
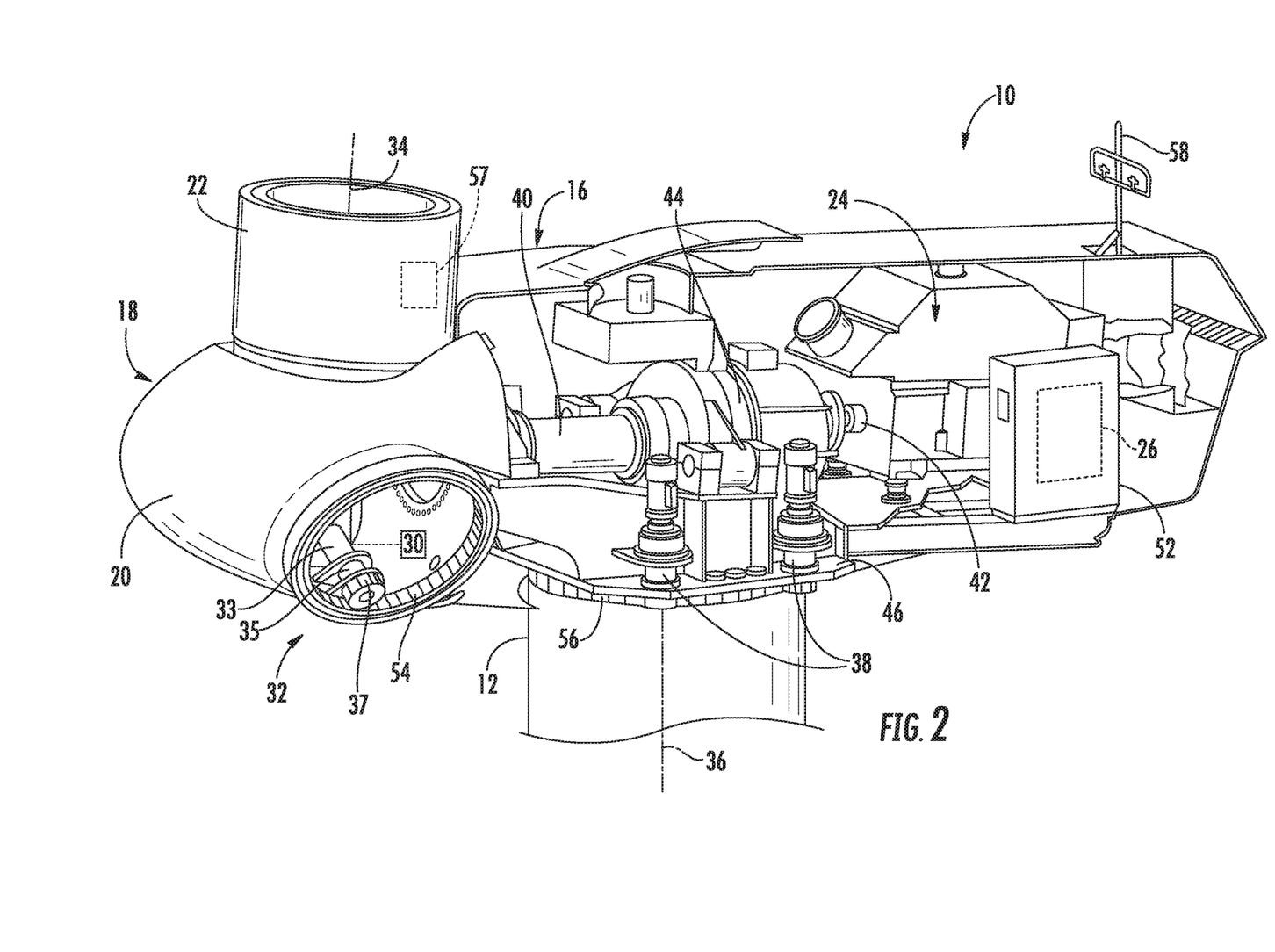
FIG. 2 illustrates a perspective, internal view of a nacelle of a wind turbine according to one embodiment of the present disclosure.

Referring now to FIG. 2, a simplified, internal view of one embodiment of the nacelle 16 of the wind turbine 10 is illustrated. As shown, a generator 24 may be disposed within the nacelle 16. In general, the generator 24 may be coupled to the rotor 18 of the wind turbine 10 for generating electrical power from the rotational energy generated by the rotor 18. For example, the rotor 18 may include a main shaft 40 coupled to the hub 20 for rotation therewith. The generator 24 may then be coupled to the main shaft 40 such that rotation of the main shaft 40 drives the generator 24. For instance, in the illustrated embodiment, the generator 24 includes a generator shaft 42 rotatably coupled to the main shaft 40 through a gearbox 44. However, in other embodiments, it should be appreciated that the generator shaft 42 may be rotatably coupled directly to the main shaft 40. Alternatively, the generator 24 may be directly rotatably coupled to the main shaft 40.

It should be appreciated that the main shaft 40 may generally be supported within the nacelle 16 by a support frame or bedplate 46 positioned atop the wind turbine tower 12. For example, the main shaft 40 may be supported by the bedplate 46 via a pair of pillow blocks 48, 50 mounted to the bedplate 46.

As shown in FIGS. 1 and 2, the wind turbine 10 may also include a turbine control system or a turbine controller 26 within the nacelle 16. For example, as shown in FIG. 2, the turbine controller 26 is disposed within a control cabinet 52 mounted to a portion of the nacelle 16. However, it should be appreciated that the turbine controller 26 may be disposed at any location on or in the wind turbine 10, at any location on the support surface 14 or generally at any other location. The turbine controller 26 may generally be configured to control the various operating modes (e.g., start-up or shut-down sequences) and/or components of the wind turbine 10.

In addition, as shown in FIG. 2, one or more sensors 57, 58 may be provided on the wind turbine 10. More specifically, as shown, a blade sensor 57 may be configured with one or more of the rotor blades 22 to monitor the rotor blades 22. It should also be appreciated that, as used herein, the term "monitor" and variations thereof indicates that the various sensors of the wind turbine 10 may be configured to provide a direct measurement of the parameters being monitored or an indirect measurement of such parameters. Thus, the sensors described herein may, for example, be used to generate signals relating to the parameter being monitored, which can then be utilized by the controller 26 to determine the condition.

Further, as shown, a wind sensor 58 may be provided on the wind turbine 10. The wind sensor 58, which may for example be a wind vane, and anemometer, and LIDAR sensor, or another suitable sensor, may measure wind speed and direction. As such, the sensors 57, 58 may further be in communication with the controller 26, and may provide related information to the controller 26. For example, yawing of the wind turbine 10 may occur due to sensing of changes in the wind direction 28, in order to maintain alignment of the wind turbine 10 with the wind direction 28. In addition, yawing of the wind turbine 10 may occur due to sensing a stuck blade, which is described in more detail herein.

Further, the turbine controller 26 may also be communicatively coupled to various components of the wind turbine 10 for generally controlling the wind turbine 10 and/or such components. For example, the turbine controller 26 may be communicatively coupled to the yaw drive mechanism(s) 38 of the wind turbine 10 for controlling and/or altering the yaw direction of the nacelle 16 relative to the direction 28 (FIG. 1) of the wind. Further, as the direction 28 of the wind changes, the turbine controller 26 may be configured to control a yaw angle of the nacelle 16 about a yaw axis 36 to position the rotor blades 22 with respect to the direction 28 of the wind, thereby controlling the loads acting on the wind turbine 10. For example, the turbine controller 26 may be configured to transmit control signals/commands to a yaw drive mechanism 38 (FIG. 2) of the wind turbine 10, via a yaw controller or direct transmission, such that the nacelle 16 may be rotated about the yaw axis 36 via a yaw bearing 56.

Still referring to FIG. 2, each rotor blade 22 may also include a pitch adjustment mechanism 32 configured to rotate each rotor blade 22 about its pitch axis 34. Further, each pitch adjustment mechanism 32 may include a pitch drive motor 33 (e.g., any suitable electric, hydraulic, or pneumatic motor), a pitch drive gearbox 35, and a pitch drive pinion 37. In such embodiments, the pitch drive motor 33 may be coupled to the pitch drive gearbox 35 so that the pitch drive motor 33 imparts mechanical force to the pitch drive gearbox 35. Similarly, the pitch drive gearbox 35 may be coupled to the pitch drive pinion 37 for rotation therewith. The pitch drive pinion 37 may, in turn, be in rotational engagement with a pitch bearing 54 coupled between the hub 20 and a corresponding rotor blade 22 such that rotation of the pitch drive pinion 37 causes rotation of the pitch bearing 54. Thus, in such embodiments, rotation of the pitch drive motor 33 drives the pitch drive gearbox 35 and the pitch drive pinion 37, thereby rotating the pitch bearing 54 and the rotor blade 22 about the pitch axis 34.

As such, the turbine controller 26 may be communicatively coupled to each pitch adjustment mechanism 32 of the wind turbine 10 (one of which is shown) through a pitch controller 30 for controlling and/or altering the pitch angle of the rotor blades 22 (i.e., an angle that determines a perspective of the rotor blades 22 with respect to the direction 28 of the wind). For instance, the turbine controller 26 and/or the pitch controller 30 may be configured to transmit a control signal/command to each pitch adjustment mechanism 32 such that the pitch adjustment mechanism(s) 32 adjusts the pitch angle of the rotor blades 22 as described herein. The turbine controller 26 may control the pitch angle of the rotor blades 22, either individually or simultaneously, by transmitting suitable control signals/commands to a pitch controller of the wind turbine 10, which may be configured to control the operation of a plurality of pitch drives or pitch adjustment mechanisms 32 of the wind turbine, or by directly controlling the operation of the plurality of pitch drives or pitch adjustment mechanisms.

Figure 3:
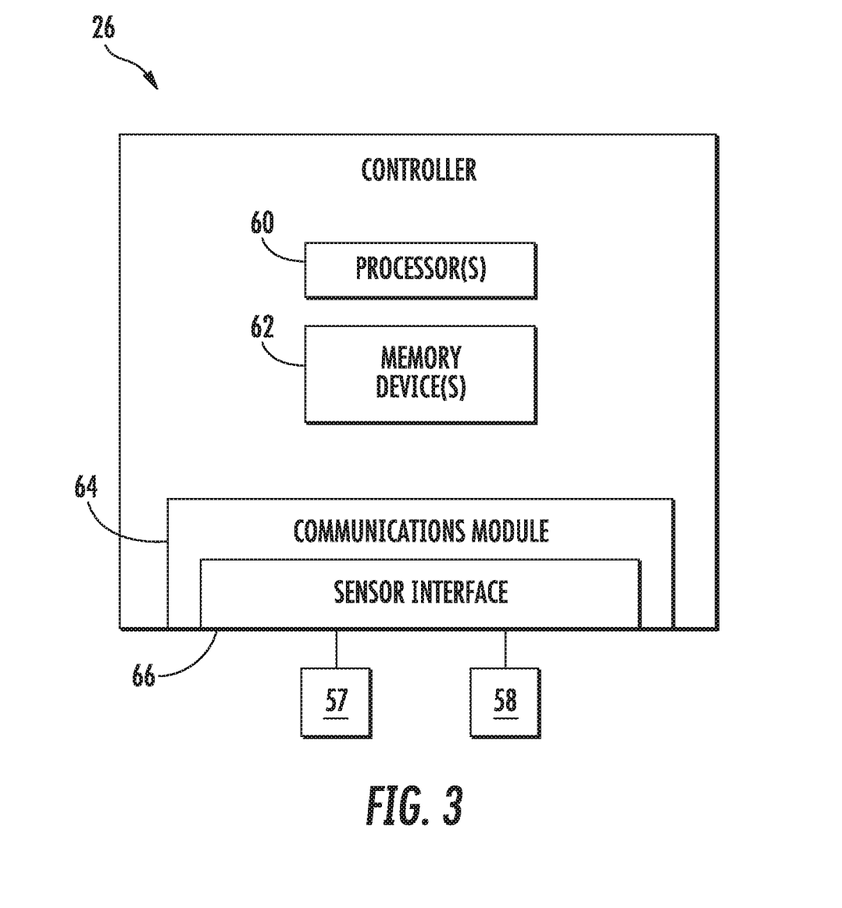
FIG. 3 illustrates a schematic diagram of one embodiment of suitable components that may be included in a wind turbine controller according to the present disclosure.

Referring now to FIG. 3, there is illustrated a block diagram of one embodiment of suitable components that may be included within the controller 26 according to the present disclosure. As shown, the controller 26 may include one or more processor(s) 60 and associated memory device(s) 62 configured to perform a variety of computer-implemented functions (e.g., performing the methods, steps, calculations and the like and storing relevant data as disclosed herein). Additionally, the controller 26 may also include a communications module 64 to facilitate communications between the controller 26 and the various components of the wind turbine 10. Further, the communications module 64 may include a sensor interface 66 (e.g., one or more analog-to-digital converters) to permit signals transmitted from one or more sensors 57, 58 to be converted into signals that can be understood and processed by the processors 60. It should be appreciated that the sensors 57, 58 may be communicatively coupled to the communications module 64 using any suitable means. For example, as shown in FIG. 3, the sensors 57, 58 are coupled to the sensor interface 66 via a wired connection. However, in other embodiments, the sensors 57, 58 may be coupled to the sensor interface 66 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 62 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 62 may generally be configured to store suitable computer-readable instructions that, when implemented by the processor(s) 60, configure the controller 26 to perform various functions including, but not limited to, transmitting suitable control signals to implement corrective action(s) in response to a distance signal exceeding a predetermined threshold as described herein, as well as various other suitable computer-implemented functions.

As discussed above, a wind turbine 10, such as the nacelle 16 thereof, may rotate about the yaw axis 36 as required. In particular, rotation about the yaw axis 36 may occur due to changes in the wind direction 28, such that the rotor 18 is aligned with the wind direction 28. For example, when the wind turbine 10 is in an idling state, the controller 26 actively tracks the wind direction to provide better alignment to the wind and minimize start-up delays when the wind speed increases or decreases back into the operating range. However, in a situation where the wind turbine 10 is in an idling or parked state and one or more of the rotor blades 22 becomes stuck, there are limited benefits to tracking the wind because repair will be required before restarting the wind turbine 10. Thus, in such situations, the turbine controller 26 is configured to implement a control strategy to reduce the drag force on the faulted rotor blade so as to reduce loads thereon and/or to prevent rotor imbalance.

Figure 4:
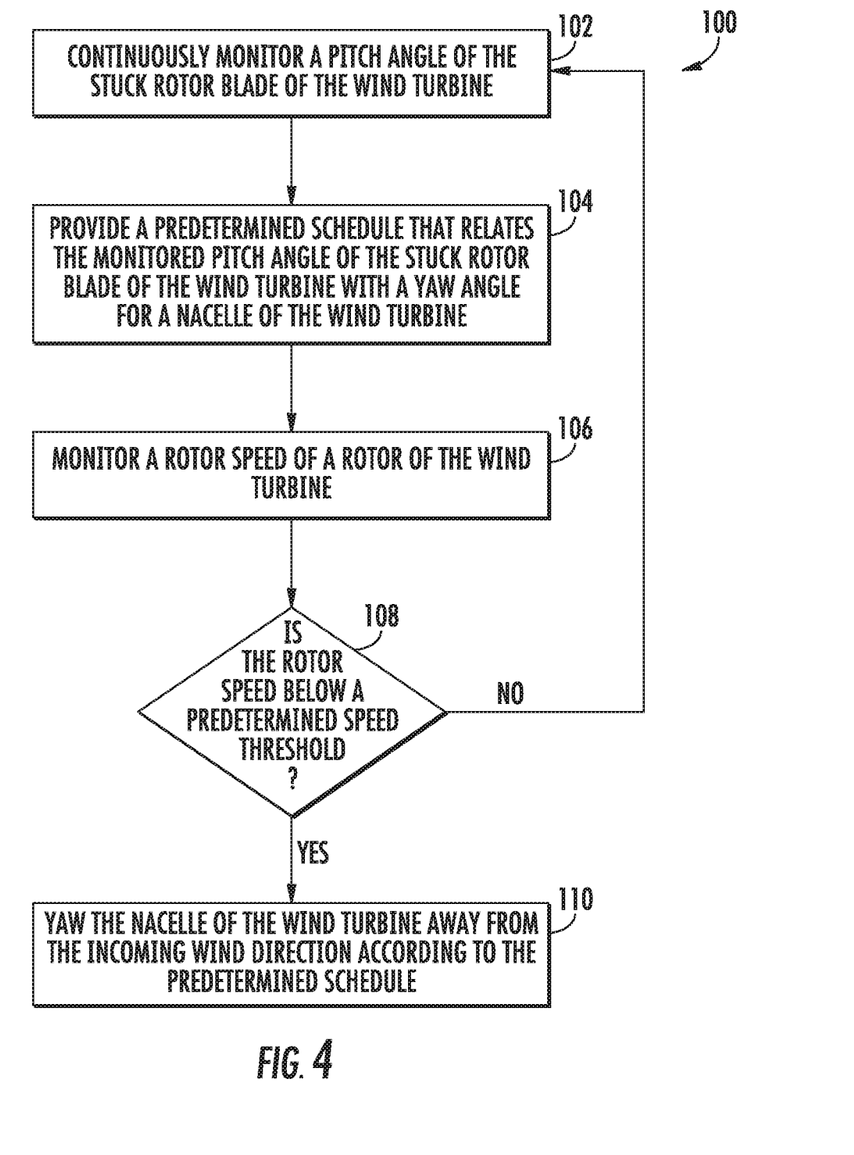
FIG. 4 illustrates a flow diagram of one embodiment of a method for reducing loads of a wind turbine according to the present disclosure.

More specifically, as shown in FIG. 4, a flow diagram of one embodiment of a method 100 for reducing loads of the wind turbine 10 in situations where the wind turbine 10 is in an idling or parked state and one or more of the rotor blades 22 becomes stuck. In general, the method 100 will be described herein with reference to the wind turbine 10 shown in FIGS. 1 and 2, as well as the various controller components shown in FIG. 3. However, it should be appreciated that the disclosed method 100 may be implemented with wind turbines having any other suitable configurations and/or within systems having any other suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

Figure 5:
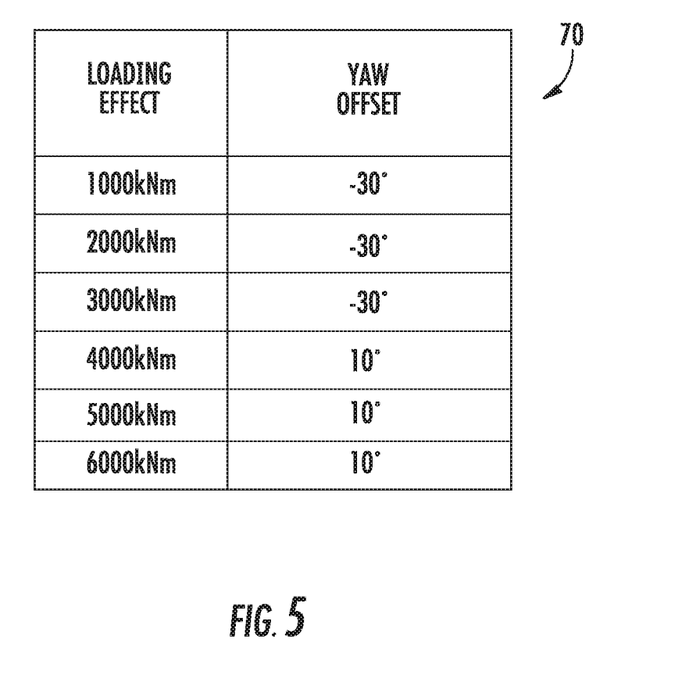
FIG. 5 illustrates a schematic diagram of one embodiment of a predetermined schedule relating the loading effect to the yaw angle/offset according to the present disclosure.

As shown at 102, the method 100 includes continuously monitoring a loading effect of the stuck rotor blade 22 of the wind turbine 10. As shown at 104, the method 100 includes providing a predetermined schedule that relates the monitored loading effect of the stuck rotor blade 22 of the wind turbine 10 with a yaw angle for a nacelle of the wind turbine. More specifically, as shown in FIG. 5, one embodiment of a predetermined schedule 70 according to the present disclosure is illustrated. For example, as shown, the illustrated predetermined schedule 70 corresponds to a look-up-table (LUT). In further embodiments, the predetermined schedule 70 may be a graph, chart, table, or any other suitable format capable of relating two data points. As shown, the predetermined schedule 70 includes a plurality of loading effects (or thresholds) each corresponding to a different yaw angle for the nacelle 16 of the wind turbine 10. It should be understood that FIG. 5 is provided as an example only and is not meant to be limiting. Rather, further embodiments may include different schedules depending on the hardware capability/simulations results/site-specific wind characteristics.

Figure 6:
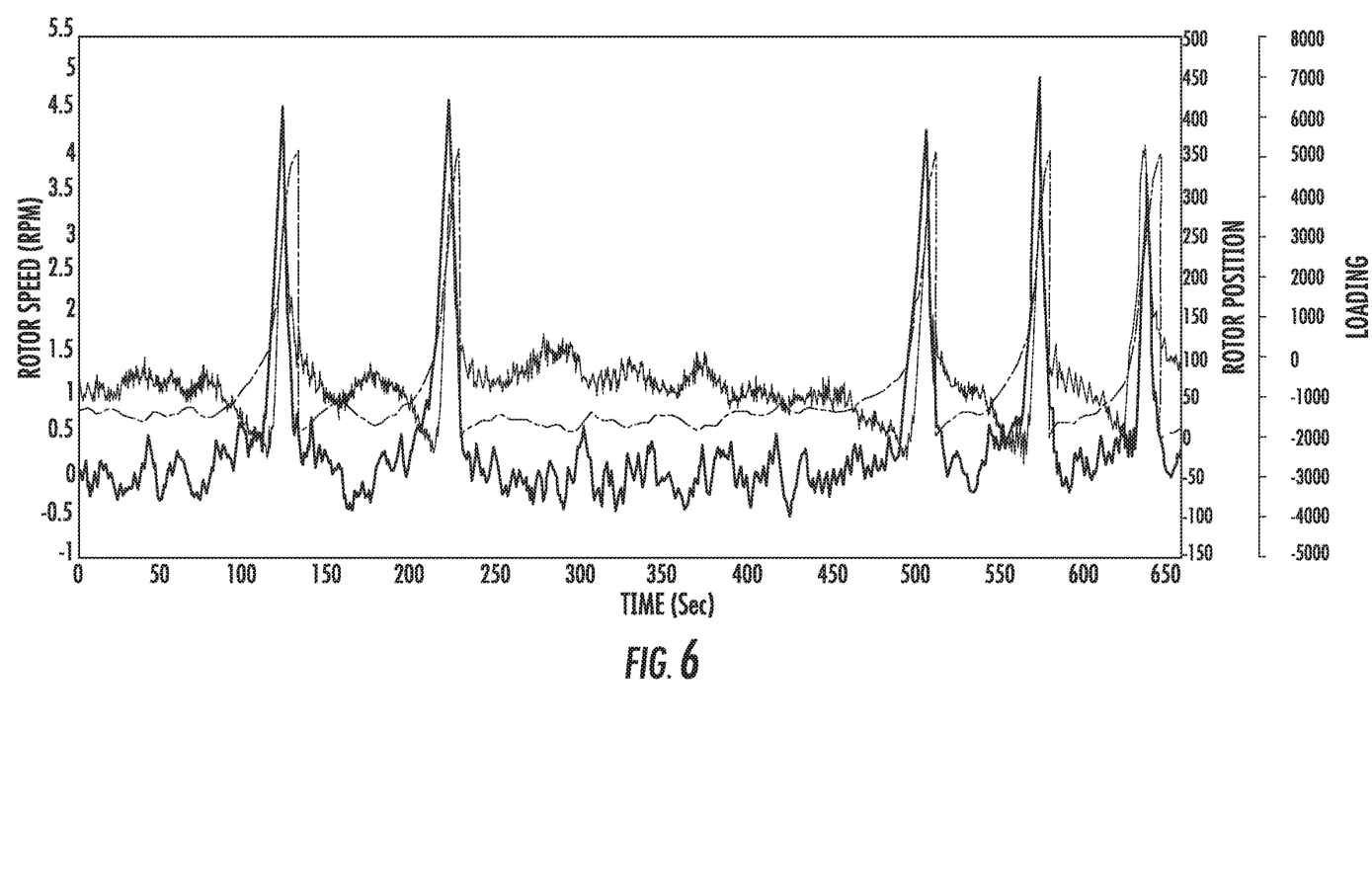
FIG. 6 illustrates a graph of one embodiment of the paddling effect of a rotor blade of a wind turbine according to the present disclosure.

Referring back to FIG. 4, as shown at 106, the method 100 may also include monitoring a rotor speed of the rotor 18 of the wind turbine 10. More specifically, as shown at 108, the method 100 may include determining whether the rotor speed is below a predetermined speed threshold. For example, when the wind turbine 10 is shutdown during an extreme wind situation and also has a stuck rotor blade 22, the blade 22 can experience a "paddling" effect that provokes high loads in the blade structure as well as the tower base bending moment. As further illustrated in FIG. 6, the paddling effect occurs at low rotor speeds 72 (e.g. the wind turbine 10 is shutdown but the rotor 18 is spinning slowly or idling) when the rotor 18 approaches the zero-degree position 74 and wind hits the wind turbine 10 while the rotor 18 deaccelerates rapidly, causing high loading 76 (as shown by the peaks in FIG. 6) in both the rotor blades 22 and/or the tower 12 of the wind turbine.

Thus, if the rotor speeds are below the predetermined speed threshold, as shown at 110, the method 100 includes yawing the nacelle 16 of the wind turbine 10 away from the incoming wind direction 28 according to the predetermined schedule 70. More specifically, in one embodiment, the controller 26 may be configured to yaw the nacelle 16 by continuously providing the different yaw angles to the yaw drive mechanisms 38 of the wind turbine 10 based on the plurality of loading effects, i.e. instead of applying a single yaw angle when the rotor blade becomes stuck. Accordingly, the method 100 may include yawing the nacelle 16 of the wind turbine 10 according to the predetermined schedule so as to avoid the paddling effect of the rotor blade 22. In certain embodiments, the method 100 may further include detecting the paddling effect of the rotor blade 22, if any, in response to yawing the nacelle 16 according to the predetermined schedule and continuously yawing the nacelle 16 of the wind turbine 10 to different yaw angles until the paddling effect is reduced below a predetermined threshold or is minimal. In additional embodiments, the method 100 may also include yawing the nacelle 16 according to the predetermined schedule only when the wind turbine 10 is shutdown or idling. Thus, yawing the nacelle 16 out of the wind provides substantial loads reduction.

Figure 7:
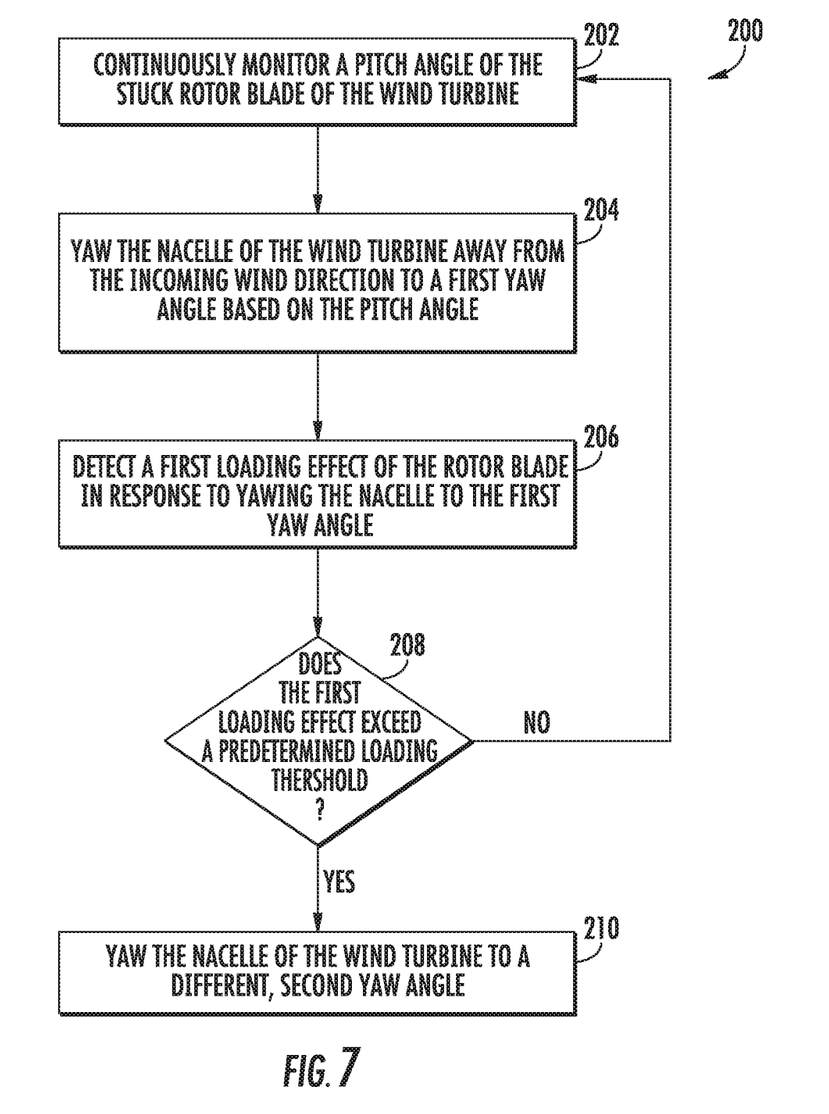
FIG. 7 illustrates a flow diagram of another embodiment of a method for reducing loads of a wind turbine according to the present disclosure.

More specifically, as shown in FIG. 7, a flow diagram of another embodiment of a method 200 for reducing loads of the wind turbine 10 in situations where the wind turbine 10 is in an idling or parked state and one or more of the rotor blades 22 becomes stuck. In general, the method 200 will be described herein with reference to the wind turbine 10 shown in FIGS. 1 and 2, as well as the various controller components shown in FIG. 3. However, it should be appreciated that the disclosed method 200 may be implemented with wind turbines having any other suitable configurations and/or within systems having any other suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at 202, the method 200 includes continuously monitoring a loading effect of the stuck rotor blade 22 of the wind turbine 10. For example, in one embodiment, the controller 26 may monitor the loading effect of the stuck rotor blade via one or more sensors. As shown at 204, the method 200 includes yawing the nacelle 16 of the wind turbine 10 away from an incoming wind direction to a first yaw angle based on the loading effect. As shown at 206, the method 200 includes detecting a first loading effect of the rotor blade 10 in response to yawing the nacelle 16 to the first yaw angle. As shown at 206, the method 200 includes determining whether the first loading effect exceeds a predetermined loading threshold. If so, as shown at 208, the method 200 includes yawing the nacelle 16 of the wind turbine 10 to a different, second yaw angle. In one embodiment, the method 200 may also include detecting a second loading effect in response to yawing the nacelle 16 to the second yaw angle. In another embodiment, the method 200 may include continuously yawing the nacelle 16 to different yaw angles until the second loading effect is reduced below a predetermined threshold or is negligible.

It should also be understood that if the wind turbine 10 continues to operate normally, the controller 26 is configured to continuously monitor the incoming wind direction 28 and yaw the nacelle 16 into the incoming wind direction 28 to provide improved alignment to the wind with minimal start-up delays when the wind speed increases or decreases back into the operating range.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for reducing loads of a wind turbine when a rotor blade of the wind turbine is stuck, the method comprising:
   continuously monitoring, via a controller, a loading effect of the stuck rotor blade of the wind turbine;
   providing, via the controller, a predetermined schedule that relates the monitored loading effect of the stuck rotor blade of the wind turbine with a yaw angle for a nacelle of the wind turbine; and, yawing, via the controller, the nacelle of the wind turbine away from an incoming wind direction according to the predetermined schedule only when the wind turbine is shutdown or idling.

2. The method of claim 1, wherein the predetermined schedule comprises a plurality of loading effects each corresponding to a different yaw angle for the nacelle of the wind turbine.

3. The method of claim 2, wherein yawing the nacelle of the wind turbine according to the predetermined schedule further comprises continuously providing the different yaw angles to one or more yaw drive mechanisms of the rotor blade based on the plurality of loading effects instead of applying a single yaw angle when the rotor blade becomes stuck.

4. The method of claim 1, further comprising monitoring a rotor speed of a rotor of the wind turbine and yawing the nacelle of the wind turbine according to the predetermined schedule only when the rotor speed is below a predetermined speed threshold.

5. The method of claim 4, further comprising yawing the nacelle of the wind turbine according to the predetermined schedule so as to avoid a paddling effect of the rotor blade, the paddling effect of the rotor blade occurring when the rotor approaches a zero-degree position and wind hits the wind turbine while the rotor deaccelerates rapidly, thereby causing high loading in the rotor blade and a tower of the wind turbine.

6. The method of claim 5, further comprising:
detecting the paddling effect of the wind turbine in response to yawing the nacelle according to the predetermined schedule; and,
continuously yawing the nacelle of the wind turbine to different yaw angles until the paddling effect is reduced below a predetermined threshold.

7. A system for reducing loads of a wind turbine when a rotor blade of the wind turbine is stuck, the system comprising:
at least one sensor configured for monitoring a loading effect of the stuck rotor blade of the wind turbine;
a controller communicatively coupled to the at least one sensor, the controller comprising at least one processor configured to perform one or more operations, the one or more operations comprising:
receiving a predetermined schedule that relates the monitored loading effect of the stuck rotor blade of the wind turbine with a yaw angle for a nacelle of the wind turbine; and,
yawing the nacelle of the wind turbine away from an incoming wind direction according to the predetermined schedule only when the wind turbine is shutdown or idling.

8. The system of claim 7, wherein the predetermined schedule comprises a plurality of loading effects each corresponding to a different yaw angle for the nacelle of the wind turbine.

9. The system of claim 8, wherein yawing the nacelle of the wind turbine according to the predetermined schedule further comprises continuously providing the different yaw angles to one or more yaw drive mechanisms of the rotor blade based on the plurality of loading effects instead of applying a single yaw angle when the rotor blade becomes stuck.

10. The system of claim 7, wherein the one or more operations further comprise monitoring a rotor speed of a rotor of the wind turbine and yawing the nacelle of the wind turbine according to the predetermined schedule only when the rotor speed is below a predetermined speed threshold.

11. The system of claim 10, wherein the one or more operations further comprise yawing the nacelle of the wind turbine according to the predetermined schedule so as to avoid a paddling effect of the rotor blade, the paddling effect of the rotor blade occurring when the rotor approaches a zero-degree position and wind hits the wind turbine while the rotor deaccelerates rapidly, thereby causing high loading in the rotor blade and a tower of the wind turbine.

12. The system of claim 11, wherein the one or more operations further comprise:
detecting the paddling effect of the wind turbine in response to yawing the nacelle according to the predetermined schedule; and,
continuously yawing the nacelle of the wind turbine to different yaw angles until the paddling effect is reduced below a predetermined threshold.

13. A method for reducing loads of a wind turbine when a rotor blade of the wind turbine is stuck, the method comprising:
continuously monitoring, via a controller, a loading effect of the stuck rotor blade of the wind turbine;
yawing, via the controller, a nacelle of the wind turbine away from an incoming wind direction to a first yaw angle based on the loading effect;
detecting, via the controller, a first loading effect of the rotor blade in response to yawing the nacelle to the first yaw angle; and,
yawing, via the controller, the nacelle of the wind turbine to a different, second yaw angle if the first loading effect exceeds a predetermined loading threshold only when the wind turbine is shutdown or idling.

14. The method of claim 13, further comprising detecting a second loading effect in response to yawing the nacelle to the second yaw angle.

15. The method of claim 14, further comprising continuously yawing the nacelle of the wind turbine to different yaw angles until the second loading effect is reduced below a predetermined threshold.

16. The method of claim 15, wherein yawing the nacelle of the wind turbine to the different, second yaw angle further comprises continuously providing the different yaw angles to one or more yaw drive mechanisms of the rotor blade instead of applying a single yaw angle when the rotor blade becomes stuck.

17. The method of claim 13, further comprising monitoring a rotor speed of a rotor of the wind turbine and yawing the nacelle of the wind turbine only when the rotor speed is below a predetermined speed threshold.

* * * * *